United States Patent
Reddy et al.

(10) Patent No.: US 9,287,742 B2
(45) Date of Patent: Mar. 15, 2016

(54) SPOKE PERMANENT MAGNET MACHINE WITH REDUCED TORQUE RIPPLE AND METHOD OF MANUFACTURING THEREOF

(71) Applicant: General Electric Company, Schenectady, NY (US)

(72) Inventors: Patel Bhageerath Reddy, Niskayuna, NY (US); Ayman Mohamed Fawzi EL-Refaie, Niskayuna, NY (US); Kum-Kang Huh, Niskayuna, NY (US); James Pellegrino Alexander, Ballston Lake, NY (US)

( * ) Notice: Subject to any disclaimer, the term of this patent is extended or adjusted under 35 U.S.C. 154(b) by 385 days.

(21) Appl. No.: 13/958,693

(22) Filed: Aug. 5, 2013

(65) Prior Publication Data
US 2015/0035402 A1    Feb. 5, 2015

(51) Int. Cl.
*H02K 21/12* (2006.01)
*H02K 1/27* (2006.01)
(Continued)

(52) U.S. Cl.
CPC .............. *H02K 1/272* (2013.01); *H02K 15/03* (2013.01); *H02K 21/16* (2013.01); *H02K 29/03* (2013.01); *Y10T 29/49012* (2015.01)

(58) Field of Classification Search
CPC ....... H02K 1/272; H02K 15/03; H02K 29/03; H02K 21/16; Y10T 29/49012; Y10T 29/49009
USPC ............. 310/156.01, 156.08–156.09, 156.11, 310/156.23, 156.48, 216.007–216.008, 310/216.011, 216.049, 216.057; 29/596, 29/598
See application file for complete search history.

(56) References Cited

U.S. PATENT DOCUMENTS 3,979,821 A * 9/1976 Noodleman ......... H02K 13/006
                                                    148/108
4,445,062 A * 4/1984 Glaser ................. H02K 1/2773
                                                    310/156.59
(Continued)

FOREIGN PATENT DOCUMENTS

DE    10 2010 061778 A1    5/2012
EP        2 254 221 A2    11/2010
(Continued)

OTHER PUBLICATIONS

Li et al., "Reduction of Cogging Torque in Permanent Magnet Motors," IEEE Transactions on Magnetics, vol. 24, No. 6, Nov. 1988, pp. 2901-2903.
(Continued)

*Primary Examiner* — Thanh Lam
(74) *Attorney, Agent, or Firm* — Meagher Emanuel Laks Goldberg & Liao, LLP (57) ABSTRACT

An internal permanent magnet machine includes a rotor assembly having a shaft comprising a plurality of protrusions extending radially outward from a main shaft body and being formed circumferentially about the main shaft body and along an axial length of the main shaft body. A plurality of stacks of laminations are arranged circumferentially about the shaft to receive the plurality of protrusions therein, with each stack of laminations including a plurality of lamination groups arranged axially along a length of the shaft and with permanent magnets being disposed between the stacks of laminations. Each of the laminations includes a shaft protrusion cut formed therein to receive a respective shaft protrusion and, for each of the stacks of laminations, the shaft protrusion cuts formed in the laminations of a respective lamination group are angularly offset from the shaft protrusion cuts formed in the laminations in an adjacent lamination group.

22 Claims, 7 Drawing Sheets

(51) Int. Cl.
 *H02K 15/03* (2006.01)
 *H02K 21/16* (2006.01)
 *H02K 29/03* (2006.01)

(56) References Cited

U.S. PATENT DOCUMENTS

| | | | | |
|---|---|---|---|---|
| 4,642,502 | A | * | 2/1987 | Carpenter ............... H02K 1/278 |
| | | | | 310/156.12 |
| 5,610,464 | A | | 3/1997 | Asano et al. |
| 5,760,520 | A | * | 6/1998 | Hasebe ................. H02K 1/278 |
| | | | | 310/156.15 |
| 5,886,440 | A | | 3/1999 | Hasebe et al. |
| 6,911,756 | B1 | * | 6/2005 | Chang ................... H02K 1/278 |
| | | | | 310/156.01 |
| 7,154,204 | B2 | * | 12/2006 | Koenig ................. H02K 1/278 |
| | | | | 310/156.19 |
| 7,205,695 | B2 | * | 4/2007 | Smith ................. G01N 29/041 |
| | | | | 310/156.38 |
| 7,245,054 | B1 | | 7/2007 | Walls et al. |
| 7,750,523 | B2 | | 7/2010 | Nakayama et al. |
| 7,994,668 | B2 | | 8/2011 | Gerstler et al. |
| 8,004,140 | B2 | | 8/2011 | Alexander et al. |
| 8,120,223 | B2 | | 2/2012 | Leonardi et al. |
| 8,405,269 | B2 | | 3/2013 | Spaggiari |
| 8,922,083 | B2 | * | 12/2014 | Asahi ................... H02K 1/2706 |
| | | | | 310/156.08 |

FOREIGN PATENT DOCUMENTS

| | | |
|---|---|---|
| KR | 101167806 B1 | 7/2012 |
| WO | 2008108520 A1 | 9/2008 |

OTHER PUBLICATIONS

"Skewing for Permanent Magnet Electrical Machines to Reduce Cogging Torque and Torque Ripple," Siemens AG, Oct. 5, 2011, p. 1.
European Search Report for EP14179274.7, dated Dec. 2, 2015 (European Application corresponding to U.S. Appl. No. 13/958,693).

* cited by examiner

SPOKE PERMANENT MAGNET MACHINE WITH REDUCED TORQUE RIPPLE AND METHOD OF MANUFACTURING THEREOF

GOVERNMENT LICENSE RIGHTS

This invention was made with Government support under contract number DE-EE0005573 awarded by the United States Department of Energy. The Government has certain rights in the invention.

BACKGROUND OF THE INVENTION

Embodiments of the invention relate generally to electrical machines and, more particularly, to spoke rotor permanent magnet electrical machines in which rotor laminations are shifted along an axial length of the machine to reduce torque ripple, while still providing for use of a single extruded rotor shaft and block magnets.

Internal permanent magnet (IPM) machines such as IPM motors or generators have been widely used in a variety of applications, including aircraft, automobiles and industrial usage, and are currently the preferred machine employed in hybrid automotive applications. Therefore, a requirement for lightweight and high power density IPM machines has resulted in the design of higher speed motors and generators to maximize the power to weight ratios. Hence, the trend is increasing acceptance of IPM machines offering high machine speed, high power density, reduced mass and cost.

In a conventional IPM machine, multiple permanent magnets are embedded inside multiple laminations of a rotor. The mechanical stresses in the rotor are concentrated in multiple bridges and center posts. For higher speed applications, the thickness of the multiple bridges and center posts have to be increased for enhanced structural strength of the rotor and various other parts. The increased thickness leads to more magnet flux leakage into the multiple bridges and center posts, with such leakage significantly reducing the machine power density, so as to result in decreased efficiency of the machine.

The use of spoke rotors in IPM machines can decouple electromagnetic and mechanical requirements in an IPM machine by eliminating the need for bridges and center posts. This substantially increases the machine power density. Also, the spoke configuration has flux-concentration effects, which further increases the machine power density. Dovetailing rotor laminations onto the shaft allows higher speeds of the rotor outer radius, which further increases the machine power density. The rotor assembly and the various associated components can be configured to provide maximum power density and minimum eddy current losses. Furthermore, IPM machines having spoke rotors are advantageous in terms of low volume, mass and cost. Spoke rotor IPM machines thus allow for highly efficient permanent magnet machines.

However, spoke electric motors with distributed windings encounter the problem of high torque ripple. Torque ripple is undesirable in electric motors because it leads to transient losses and increasing the complexity of the control of the machine as well as mechanical issues in the drivetrain. Motors having stators with distributed windings usually encounter high torque ripple, while the use of spoke rotors with stators having distributed windings add additional harmonics, further increasing the torque ripple.

A standard approach to reducing torque ripple includes stator shifting by the slot pitch, and standard techniques introduce stator shifting by half a slot. Unfortunately, stator shifting or stepping along the axis can place stress on insulation material in the slots and reduces torque content in the machine. Also, stator shifting creates sharp edges which can cut into the slot insulation affecting the robustness and reliability of the motor.

Another method of reducing torque ripple known as rotor shifting eliminates problems with insulation, but rotor shifting is difficult because it complicates the construction of the rotor, leading to a more complicated shaft as well as manual insertion of magnets in shifted rotor laminations. The use of extruded shafts in rotor construction can reduce manufacturing complications, but may still require manual insertion of magnets at different axial locations or extrusion for different axial lengths.

Therefore, it is desirable to provide a spoke permanent magnet machine having a construction that reduces torque ripple, while eliminating the concerns associated with existing stator shifting and rotor shifting techniques and construction.

BRIEF DESCRIPTION OF THE INVENTION

In accordance with one aspect of the invention, an internal permanent magnet machine includes a stator assembly comprising a stator core including a plurality of stator teeth and stator windings wound about the plurality of stator teeth to generate a stator magnetic field when excited with alternating currents. The internal permanent magnet machine also includes a rotor assembly disposed within a cavity defined by the stator assembly and configured to rotate relative to the stator assembly, wherein the rotor assembly further includes a shaft comprising a plurality of protrusions extending radially outward from a main shaft body and being formed circumferentially about the main shaft body and along an axial length of the main shaft body, a plurality of stacks of laminations arranged circumferentially about the shaft to receive the plurality of protrusions therein and each comprising a plurality of lamination groups arranged axially along a length of the shaft and wherein each of the plurality of lamination groups comprises a plurality of laminations; and a plurality of permanent magnets configured to generate a magnetic field that interacts with the stator magnetic field to produce a torque, wherein each permanent magnet is disposed between a respective pair of adjacent stacks of laminations. Each of the plurality of laminations includes a shaft protrusion cut formed therein to receive a respective shaft protrusion, and wherein, for each of the plurality of lamination stacks, the shaft protrusion cuts formed in the laminations of a respective lamination group are angularly offset from the shaft protrusion cuts formed in the laminations in an adjacent lamination group.

In accordance with another aspect of the invention, a method for assembling an internal permanent magnet machine includes providing a stator assembly comprising a stator core having a plurality of stator teeth with stator windings wound on the stator teeth to generate a stator magnetic field when excited with alternating currents and providing a rotor assembly that is rotatable within a cavity formed by the stator assembly. The step of providing the rotor assembly further includes providing a shaft comprising a plurality of protrusions that extend radially along an axial length of the rotating shaft and are formed circumferentially about the shaft and placing a plurality of stacks of laminations onto the plurality of shaft protrusions of the shaft such that the plurality of stacks of laminations are positioned circumferentially around the shaft and such that each of the plurality of stacks of laminations is arranged into a plurality of lamination groups along the axial length of the shaft, with the plurality of stacks of laminations being placed onto the plurality of shaft protrusions of the shaft such that adjacent lamination groups in each stack of laminations are positioned on the shaft to have an angular offset relative to each other. The step of providing the rotor assembly still further includes securing a plurality of permanent magnets in openings defined by the plurality of stacks of laminations, the plurality of permanent magnets generating a magnetic field that interacts with the stator magnetic field to produce a torque.

In accordance with yet another aspect of the invention, a rotor assembly for use in an internal permanent magnet machine includes a shaft having a shaft body and a plurality of protrusions extending radially outward from the shaft body, with the plurality of protrusions being formed along an axial length of the shaft and circumferentially about the shaft. The rotor assembly also includes a plurality of stacks of laminations disposed on the radial protrusions with each of the plurality of stacks of laminations comprising a plurality of lamination groups arranged axially along the shaft and wherein each of the plurality of lamination groups comprises a plurality of laminations and a plurality of permanent magnets disposed between the plurality of stacks of laminations. A shape of the laminations in each of the plurality of lamination groups of a stack of laminations is different from the shape of the laminations in others of the plurality of lamination groups in a stack of laminations.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed towards the reduction of torque ripple in an IPM machine, particularly in segmented spoke rotor electrical machines having distributed windings, while providing such torque ripple reduction without increasing complexity in manufacturing of the machine. Reduction of torque ripple occurs by shifting the rotor laminations and magnets in between laminations over the axial length of the machine. In one embodiment, all of the shifting can occur on the rotor side, preventing negative effects that stator shifting has on stator insulation and winding insertion.

The IPM machine includes a stack of laminations preferably shaped in a dovetail configuration for engagement with multiple permanent magnets, which laminations are mounted on multiple protrusions circumferentially around a shaft in a rotor assembly. As used herein, the term 'dovetail' refers to fan-shaped features that form a tight interlocking joint between the rotor laminations and a shaft. The lamination stacks are further configured in groups which may be angularly offset from adjacent groups in order to pass a stator winding at different points in time.

Figure 1A:
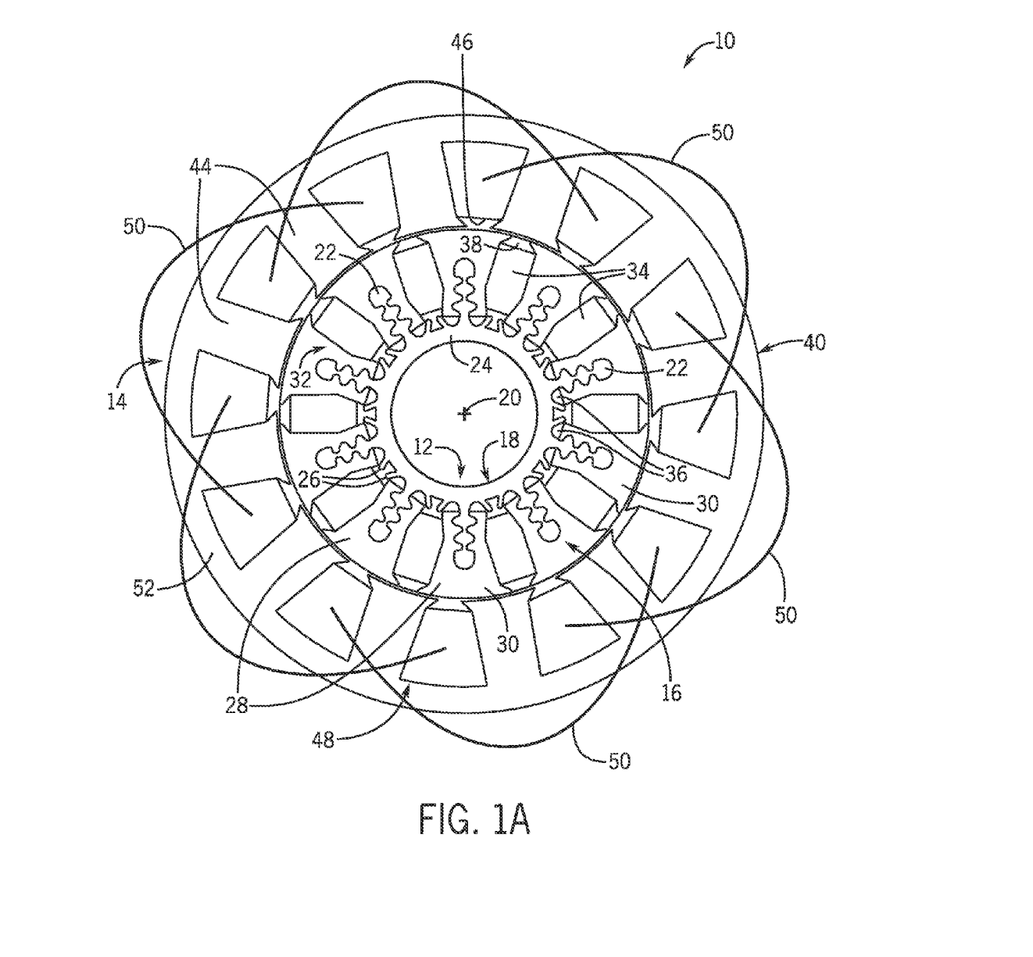
FIGS. 1A and 1B are cross-sectional views of an internal permanent magnet (IPM) machine, including a stator assembly and a rotor assembly, in accordance with exemplary embodiments of the invention.

FIG. 1A illustrates a cross-sectional view of an internal permanent magnet (IPM) machine 10 including a rotor assembly 12 and a stator assembly 14. As shown in FIG. 1A, the IPM machine 10 is configured as a segmented spoke rotor permanent magnet machine. The rotor assembly 12 includes a rotor core 16 disposed on a rotor shaft 18, with the rotor core 16 being configured to rotate about a longitudinal axis 20 of the IPM machine 10. The shaft 18 is constructed to have multiple protrusions 22 formed on a main shaft body 24, with the protrusions 22 being formed circumferentially about the main shaft body 24 and along an axial length of the main shaft body 24. In the illustrated embodiment, the shaft 18 also includes multiple bottom features 26 alternatively arranged relative to the multiple protrusions 22.

As shown in FIG. 1A, the rotor core 16 is constructed as a segmented rotor formed from a plurality of separate salient rotor poles 28. Each of the rotor poles 28 is formed from a stack of laminations 30 that is disposed on a respective protrusion 22. The stacks of laminations 30 forming the rotor poles 28 are arranged (i.e., dovetailed) circumferentially around the shaft 18, such that interpolar gaps 32 (i.e., dovetailed recess) are formed between adjacent rotor poles 28. Permanent magnets 34 are disposed between adjacent stacks of laminations 30 within the rotor core 16, with the permanent magnets 34 generating a magnetic field to be radially directed in an air gap between the rotor assembly 12 and the stator assembly 14. The magnetic field generated by the permanent magnets 34 further interacts with a stator magnetic field to produce a torque. The permanent magnets 34 provide an arrangement, which is a dovetail spoke configuration, particularly well suited for high-speed applications. The dovetail spoke configuration provides for superior magnetic flux-concentration effects, thereby enhancing the machine power density. In one embodiment, the permanent magnets 34 may be made of neodymium-boron-iron. In another embodiment, the permanent magnets 34 are made of samarium-cobalt, or ferrite, or Alnico, or any combination of these magnets.

According to one embodiment, the rotor assembly 12 also includes multiple bottom wedges 36 disposed on the bottom structures 26 of the shaft 18. The multiple bottom wedges 36 are arranged to hold the multiple stacks of laminations 30 and the multiple permanent magnets 34 in the rotor assembly and further prevents from splaying during high-speed rotations. In one embodiment, the bottom wedges 36 are non-metallic wedges for reducing the eddy current losses in the rotor core 16, as well as metallic protrusions in cases with lower rotor eddy current losses. In a particular embodiment, the rotor assembly 12 is also provided with multiple top wedges 38 covering the outer periphery of the rotor assembly 12 to prevent the permanent magnets 34 from splaying due to a centrifugal force generated in the high-speed rotor core 16.

As illustrated herein, a dovetail spoke configuration of a stack of laminations 30 and permanent magnets 34 provides for superior magnetic flux-concentration effects, thereby enhancing the machine power density of the IPM machine 10. The bottom wedges 36 are preferably non-metallic and do not allow the flow of magnetic flux lines through them, thereby preventing magnetic flux leakages. Similarly, the top wedges 38 are also preferably non-metallic and prevent the flow of magnetic flux through them, thereby avoiding magnetic flux leakages. In one embodiment, multiple top wedges 38 and multiple bottom wedges 36 are provided on the laterally opposite ends of multiple permanent magnets 34. The non-metallic top wedges 38 and bottom wedges 36 serve to obstruct the flow of magnetic flux and thereby assure that the magnetic flux exits from the permanent magnets 34 and couples with the stator windings substantially without leakage.

Figure 1B:
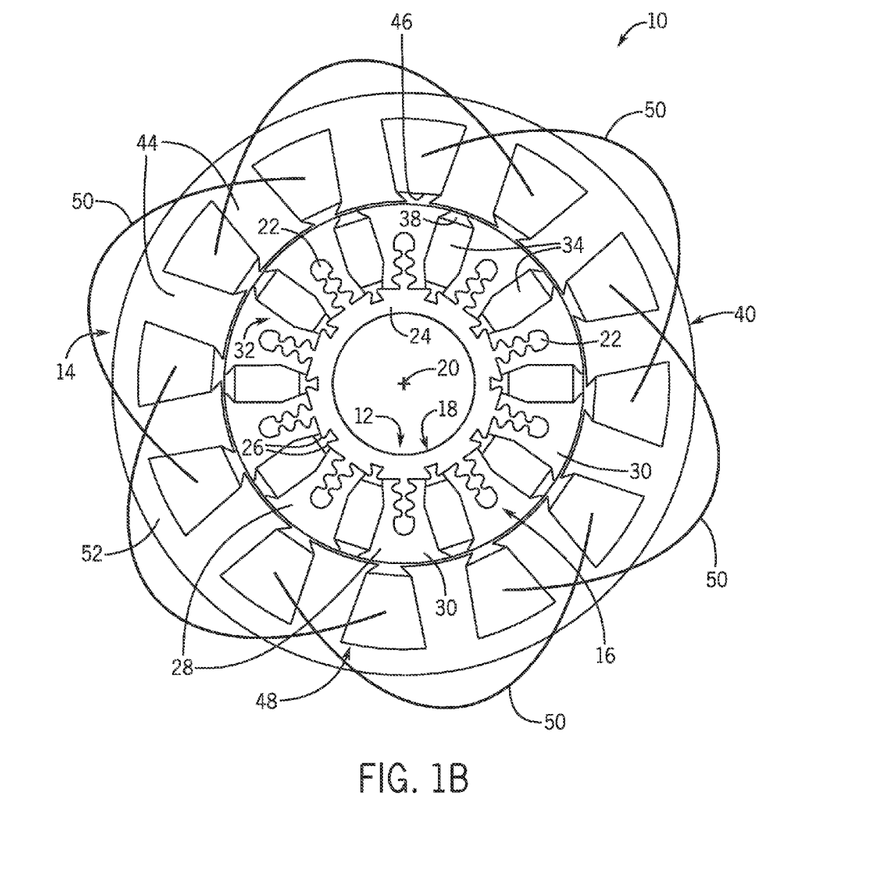

While the embodiment of rotor assembly 12 shown in FIG. 1A includes bottom wedges 36 disposed on the bottom structures 26 of the shaft 18, it is recognized that in some cases, e.g., with lower eddy current losses, these lower metallic wedges 36 can be instead occupied by the shaft 18, as in the embodiment of rotor assembly shown in FIG. 1B. That is, in some cases, separate wedge elements 36 may not be needed and can be removed, and the shaft 18 can be constructed (i.e., protrude out) to hold the multiple stacks of laminations 30 and the multiple permanent magnets 34 in the rotor assembly to prevent splaying during high-speed rotations.

Referring to FIGS. 1A and 1B, and regarding the stator assembly 14 of the IPM machine 10, the stator assembly 14 of the IPM machine 10 includes a stator core 40 having multiple stator teeth 44 arranged circumferentially so as to form a cavity 46 at a center of the stator core 40. The stator assembly 14 generates a magnetic field and extends along the longitudinal axis 20 with an inner surface defining the cavity 46. The rotor assembly 12, as discussed above, is disposed within the cavity 46 defined by the stator core 40. The stator assembly 14 includes stator slots 48 for receiving distributed windings 50 therein that are wound on the teeth 44. The windings 50 may be formed as copper coils, for example, and function to produce a fairly sinusoidal rotating field in the air gap when excited by AC currents. The stator assembly 14 also includes a stator back iron 52.

Figure 2:
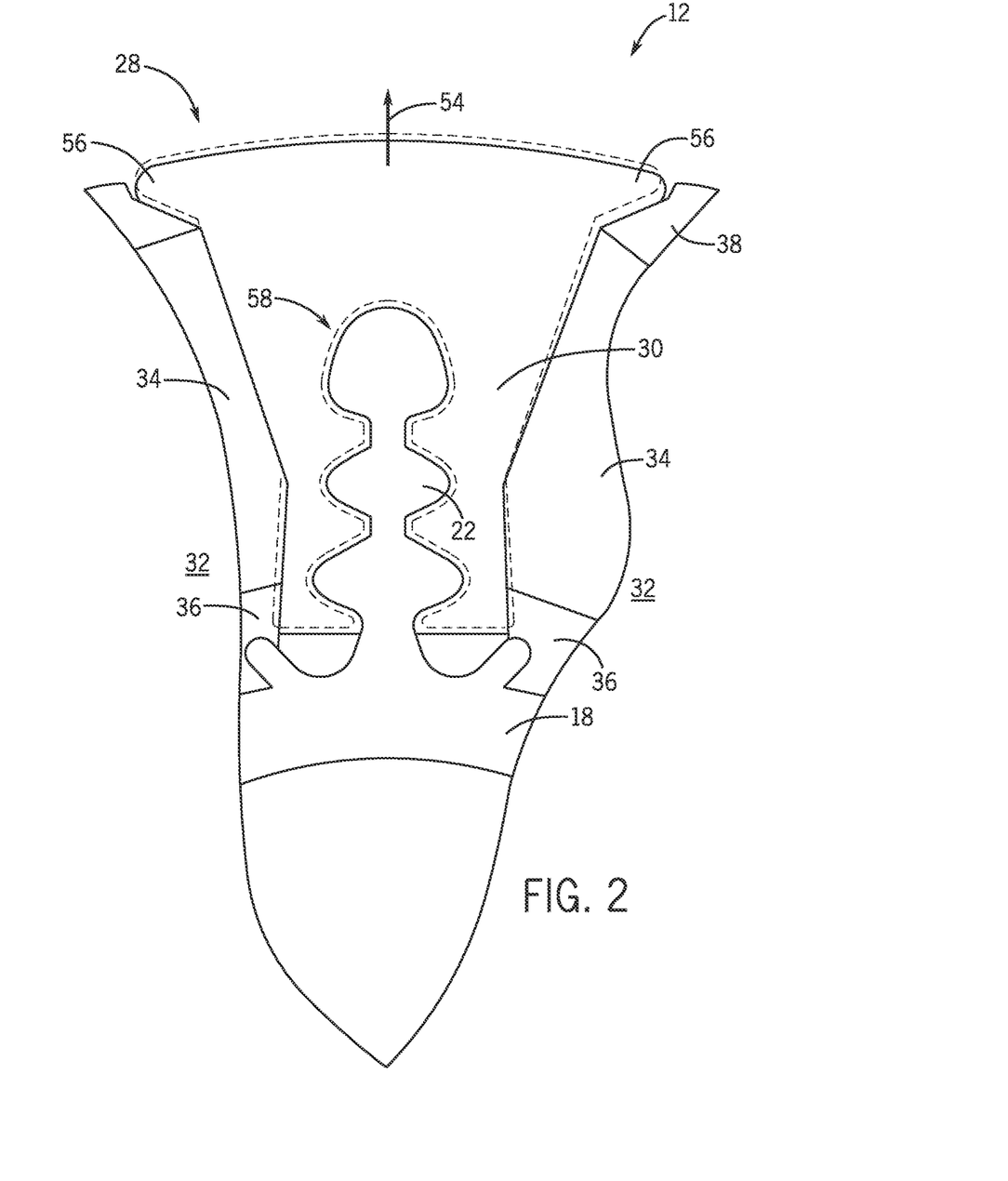
FIG. 2 is a partial cross-sectional view of the IPM machine of FIG. 1A in accordance with an exemplary embodiment of the invention.

Referring now to FIG. 2, a partial cross-sectional view of an exemplary rotor assembly 12 is shown, with the general structure of a single salient rotor pole 28 being shown in greater detail. A rotor pole 28 is formed from a stack of laminations 30 disposed on a protrusion 22 of the shaft 18. As illustrated herein, the each rotor lamination 30 generally has a dovetail configuration, such that the plurality of rotor poles 28 forming the rotor core are dovetailed circumferentially around the shaft 18. The interpolar gap (i.e., dovetailed recess) 32 between adjacent stacks of laminations 30 receives a permanent magnet 34, thereby, enabling the permanent magnet 34 to be held radially between adjacent stacks against centrifugal force 54 caused by rotation. Further, in a particular embodiment, the rotor assembly 12 is provided with multiple top wedges 38 covering the outer periphery of the rotor assembly 12 to positively restrain the permanent magnets 34. Furthermore, each lamination is provided with lip-shaped features 56 which partially cover the top wedges 38. This also ensures the permanent magnets 34 to be firmly held in the dovetail recess 32 of the rotor assembly 12.

In one embodiment, the rotor assembly 12 is provided with multiple bottom wedges 36 disposed on multiple bottom structures 26 of the shaft 18. In a preferred embodiment, the bottom wedges 36 are non-metallic and prevent magnetic flux leakages, thereby further reducing eddy current losses. In yet another embodiment, the bottom wedges 36 and the bottom structures 186 are configured such that a portion of the bottom wedges 36 lies in the dovetailed recess 32 between the stacks of laminations 30 beneath the multiple permanent magnets 34. This prevents splaying of the multiple stacks of laminations 30 which is a consequence of the centrifugal forces acting upon the inclined faces of the "dovetail" feature in the laminations 30 and protrusions 22. It is recognized, however, that lower metallic wedges 36 can instead be occupied by the shaft 18 (see FIG. 1B) with the shaft 18 being constructed (i.e., protruding out) to hold the multiple stacks of laminations 30 and the multiple permanent magnets 34 in the rotor assembly to prevent splaying during high-speed rotations.

With regard to the rotor pole 28 shown in FIG. 2, it is seen that a shaft protrusion cut 58 is formed in the rotor laminations—such as by being laser cut into the laminations—that is configured to receive a respective shaft protrusion 22. According to an exemplary embodiment of the invention, the position of the shaft protrusion cut 58 that is formed in the lamination 30 can be varied amongst the laminations that form a respective rotor pole 28. That is, for a stack of laminations 30 that forms a particular rotor pole 28, the location/position of the shaft protrusion cut 58 can be varied such that it is located at a different angular location for different laminations 30 in the lamination stack. Thus, while the shaft protrusion cut 58 is shown in FIG. 2 as being centered on the lamination 30, other laminations 30 in a lamination stack rotor pole 28 will include a shaft protrusion cut 58 that is angularly offset from center. Such angular variation of the shaft protrusion cut 58 in the rotor laminations 30 that form a rotor pole 28 serves to introduce a net rotor shift in the rotor assembly 12 that reduces torque ripple in the IPM machine 10. The angular variation of the shaft protrusion cut 58 in the rotor laminations 30 provides reduced torque ripple while still enabling use of a single extruded rotor shaft 18 in the rotor assembly 12 and "magnet blocks" that may be used to form the permanent magnet 34, as will be explained further below.

Figure 3:
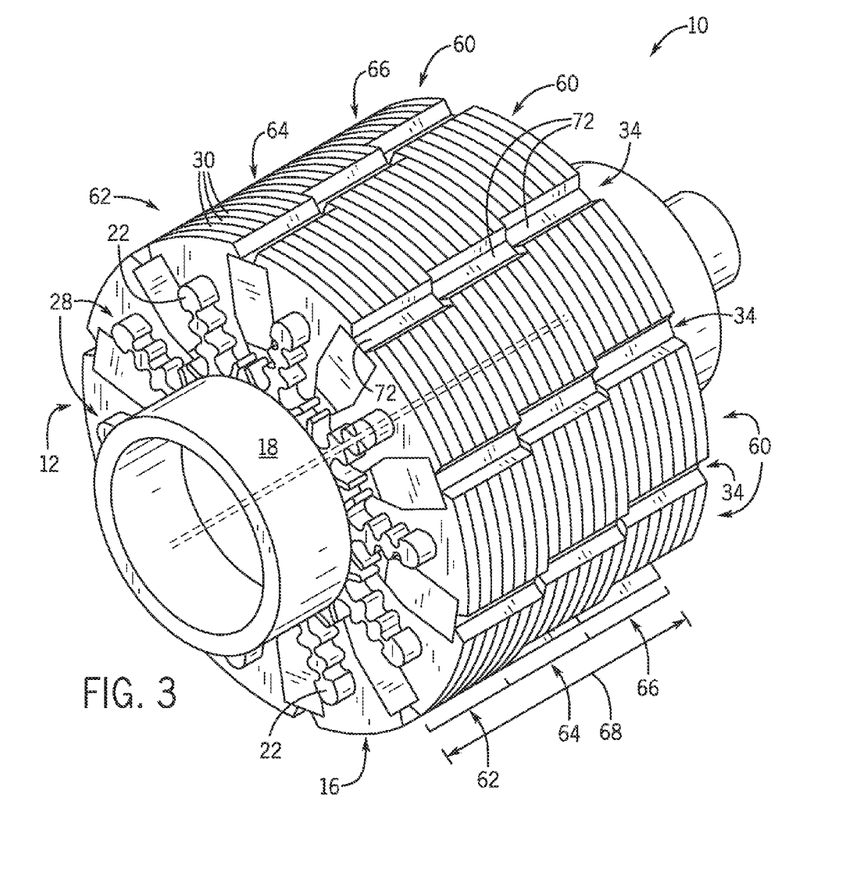
FIG. 3 is a perspective view of the IPM machine of FIG. 1A in accordance with an exemplary embodiment of the invention.

Referring now to FIG. 3, a perspective view of the IPM machine 10 is provided, where a rotor shift is introduced by the use of rotor laminations 30 with angularly varied shaft protrusion cuts 58 formed therein. As seen in FIG. 3, the rotor assembly 12 includes a plurality of stacks 60 of rotor laminations 30 that collectively form the segmented rotor core 16, with each stack 60 of laminations 30 forming a respective salient rotor pole 28 of the segmented rotor core. As further seen in FIG. 3, each stack 60 of laminations 30 is divided into a number of lamination groups 62, 64, 66 that are arranged axially (direction 68) along the rotor shaft 18—with each of the lamination groups being formed from a plurality of laminations 30. According to an exemplary embodiment of the invention, each stack 60 of laminations 30 forming a respective rotor pole 28 includes a first lamination group 62, second lamination group 64, and a third lamination group 66—although it is recognized that a greater number of lamination groups could be defined for each rotor pole 28. The structure of the rotor assembly 12 can be further characterized in that—for a particular axial location of the rotor assembly 12—the rotor laminations 30 at that particular axial location can be referred to collectively as a "set" 70 of rotor laminations. Thus, for example, the front rotor laminations 30 that are visible in FIG. 3 at the front end of the rotor assembly 12 would collectively be referred to as a set 70 of laminations 30.

According to embodiments of the invention, the shaft protrusion cut 58 formed in the laminations 30 of a respective lamination group 62, 64, 66 are angularly offset from the shaft protrusion cut 58 formed in the laminations 30 in an adjacent lamination group 62, 64, 66, as will be further detailed below. As the shaft protrusion cut 58 formed in the laminations 30 of a respective lamination group 62, 64, 66 are angularly offset from the shaft protrusion cut 58 formed in the laminations 30 of other lamination groups 62, 64, 66, the angular position of each group of laminations 62, 64, 66 is shifted relative to the other groups so as to accommodate the use of a single extruded rotor shaft 18. That is, by angularly shifting the groups of laminations 62, 64, 66 in a lamination stack 60, the rotor shaft 18 is allowed to pass through the angularly offset shaft protrusion cuts 58 formed in the lamination groups 62, 64, 66 of a respective lamination stack 60 (i.e., rotor pole 28). It is further recognized that—for a set of rotor laminations 70 at a particular axial location—each rotor lamination 30 in the set 70 will include a shaft protrusion cut 58 formed at an identical location within the lamination.

As further shown in FIG. 3, the permanent magnet 34 inserted between each adjacent pair of rotor poles 28 is in fact formed from a number of magnet blocks 72—with a magnet block 72 corresponding to each of the lamination groups 62, 64, 66 (i.e., for each permanent magnet 34, a separate magnet block 72 is associated with each lamination group 62, 64, 66). Following the angular shift of each group of laminations 62, 64, 66 of a lamination stack 60 for a rotor pole 28 relative to the other groups 62, 64, 66 of the rotor pole 28, each magnet block 72 of a permanent magnet 34 is shifted relative to the other magnet blocks 72, such that during operation of the IPM machine 10, the magnet blocks 72 of a particular permanent magnet 34 will pass a same stator winding 50 at a different time while the rotor assembly 12 rotates, thereby reducing torque ripple in the IPM machine 10. As can be seen in FIG. 3, the magnet blocks 72 for each permanent magnet 34 are of uniform size and shape, so as to simplify an insertion process of the blocks 34 into the rotor assembly 12.

Referring now to FIGS. 4-9, and with reference being made still to FIG. 3, varying constructions/shapes of rotor laminations 30 that would be included in the lamination groups 62, 64, 66 are shown according to embodiments of the invention. The laminations 30 can generally be described as having a "standard" lamination configuration or a "non-standard" lamination configuration, with the standard lamination having a shaft protrusion cut 58 centered on the lamination 30 and the non-standard laminations having a shaft protrusion cut 58 offset from center on the lamination 30.

Figure 4:
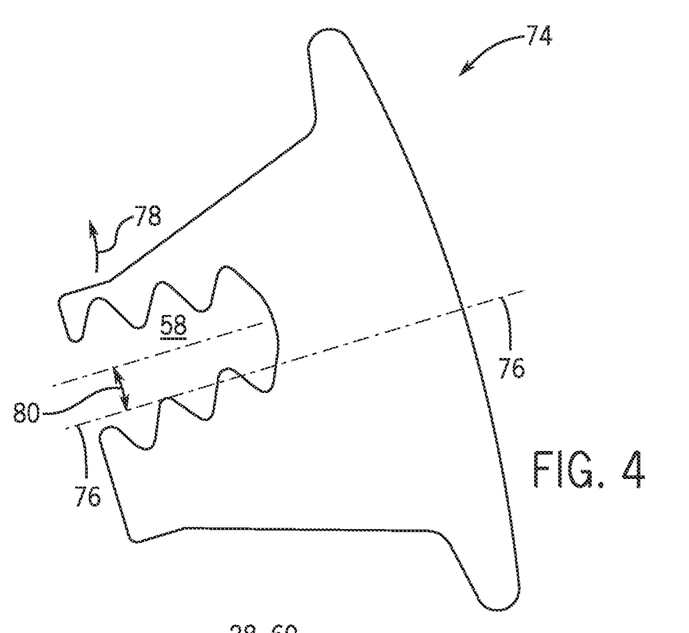
FIGS. 4 and 5 are views of a rotor lamination having a shaft protrusion cut formed therein that is angularly offset from center in a first direction for use in the IPM machine of FIG. 3 in accordance with an exemplary embodiment of the invention.
Figure 5:
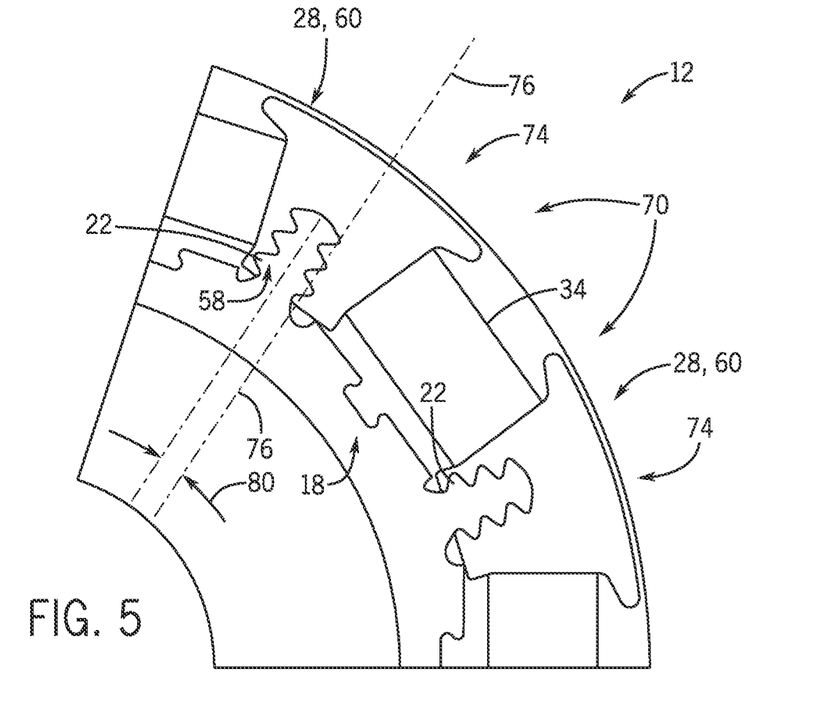

Referring first to FIGS. 4 and 5, a rotor lamination 74 having a first non-standard lamination configuration is shown in which the shaft protrusion cut 58 formed in the lamination 74 is offset from center (i.e., centerline 76) in a first angular direction 78. According to an embodiment of the invention, the rotor laminations 74 are used to form the first lamination group 62 on each of the plurality of lamination stacks 60. As such, each rotor lamination 74 in a rotor set 70 having an axial location falling within the axial length of the first lamination group 62 (i.e., all laminations arranged circumferentially about the shaft at a particular axial location falling within the first group) will have a first non-standard lamination configuration 74. As shown in FIGS. 4 and 5, the shaft protrusion cut 58 is formed so as to be offset from center by an angle—indicated as 80—that is selected during manufacturing of the lamination 74. The angle 80 by which the shaft protrusion cut 58 is positioned off-center has a maximum value of about half of the slot pitch—which is defined as the angle between two slots multiplied by the number of pole-pairs. It is recognized that the angular offset 80 of the shaft protrusion cut 58 from center 76 could be less than this maximum value.

Figure 6:
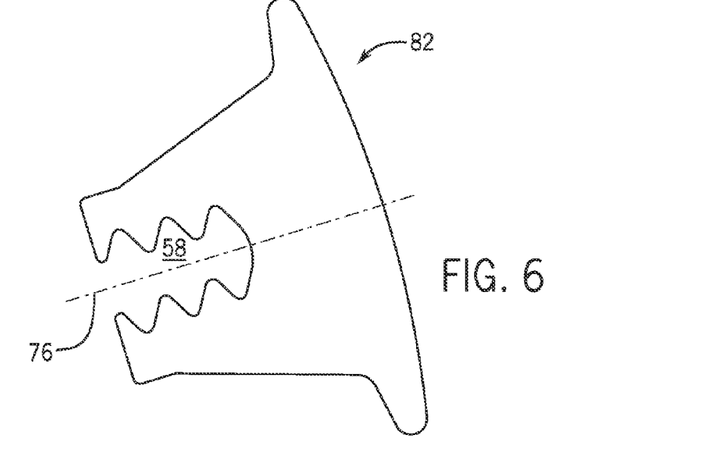
FIGS. 6 and 7 are views of a rotor lamination having a centered shaft protrusion cut formed therein for use in the IPM machine of FIG. 3 in accordance with an exemplary embodiment of the invention.
Figure 7:
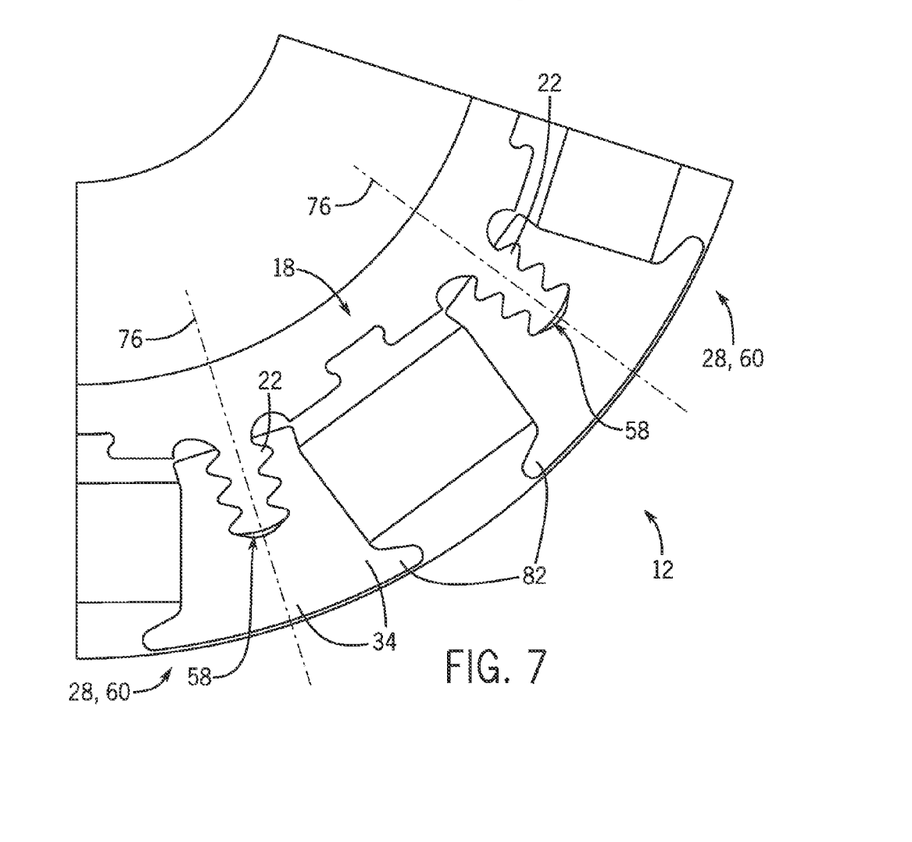

Referring now to FIGS. 6 and 7, a rotor lamination 82 having a standard lamination configuration is shown in which the shaft protrusion cut 58 formed in the lamination is centered on the lamination—i.e., centered about centerline 76. According to an embodiment of the invention, the rotor laminations 82 are used to form the second lamination group 64 on each of the plurality of lamination stacks 60. As such, each rotor lamination 82 in a rotor set 70 having an axial location falling within the axial length of the second lamination group 64 will have a standard lamination configuration.

Figure 8:
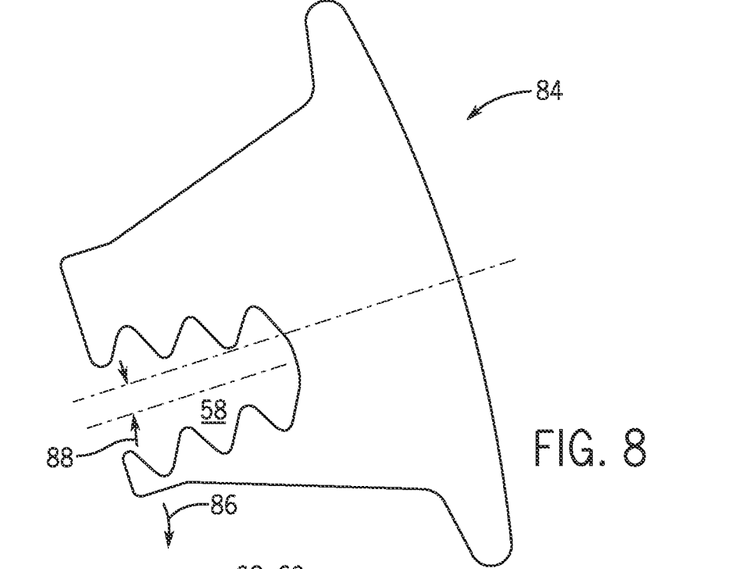
FIGS. 8 and 9 are views of a rotor lamination having a shaft protrusion cut formed therein that is angularly offset from center in a second direction for use in the IPM machine of FIG. 3 in accordance with an exemplary embodiment of the invention.
Figure 9:
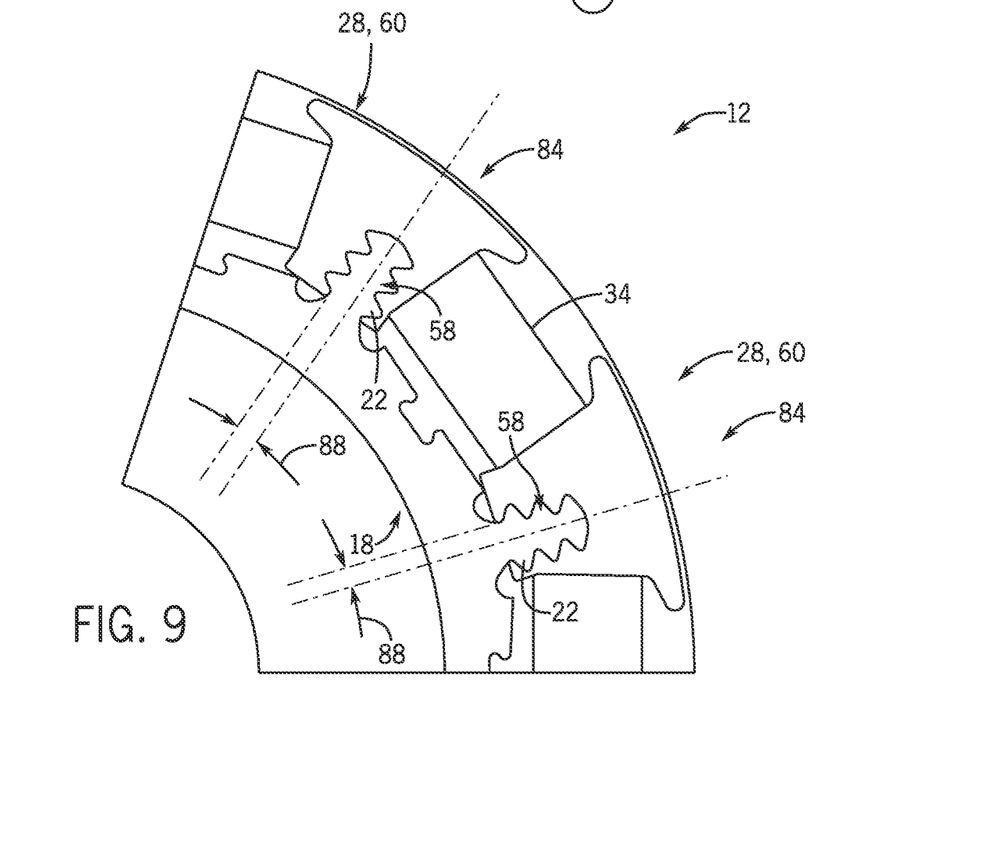

Referring now to FIGS. 8 and 9, a rotor lamination 84 having a second non-standard lamination configuration is shown in which the shaft protrusion cut 58 formed in the lamination 84 is offset from center (i.e., centerline 76) in a second angular direction 86 that is opposite the first angular direction 78 (FIG. 4). According to an embodiment of the invention, the rotor laminations 84 are used to form the third lamination group 66 on each of the plurality of lamination stacks 60. As such, each rotor lamination 84 in a rotor set 70 having an axial location falling within the axial length of the third lamination group 66 will have a second non-standard lamination configuration. As shown in FIGS. 8 and 9, the shaft protrusion cut 58 is formed so as to be offset from center 76 by an angle—indicated as 88—that is selected during manufacturing of the lamination. The angle 88 by which the shaft protrusion cut 58 is positioned off-center has a maximum value of about half of the slot pitch—which is defined as the angle between two slots multiplied by the number of pole-pairs. It is recognized that the angular offset 88 of the shaft protrusion cut 58 from center could be less than this maximum value.

According to an embodiment of the invention, the shaft protrusion cut 58 formed in the laminations 74 of the first lamination group 62 and the laminations 84 of the third lamination group 66 may be offset from center 76 by an equal angle (i.e., angle 80 is equal to angle 88) so as to be symmetrically formed about the shaft protrusion cut 58 formed in the laminations 82 of the second lamination group 64. Alternatively, according to another embodiment of the invention, the shaft protrusion cut 58 formed in the laminations 74 of the first lamination group 62 and the laminations 84 of the third lamination group 66 may be offset from center 76 by a different angle (i.e., angle 80 is not equal to angle 88) so as to be asymmetrically formed about the shaft protrusion cut 58 formed in the laminations 82 of the second lamination group 64. Design considerations of the IPM machine 10 can dictate whether the shaft protrusion cut 58 in the laminations 74, 84 is formed symmetrically or asymmetrically about the shaft protrusion cut 58 in the laminations 82.

Beneficially, embodiments of the invention thus provide a segmented spoke rotor IPM electrical machine 10 having reduced torque ripple. Incorporation of rotor laminations 74, 82, 84 having shaft protrusion cuts 58 formed therein at varying angles/locations serves to introduce a net rotor shift in the IPM machine 10 by an equivalent electrical angle equal to a single stator slot shift. Incorporation of the rotor laminations 74, 82, 84 provides this reduced torque ripple while retaining the advantages of enabling use of an extruded spoked rotor shaft, a simple stator construction (with no stator shifting), and permanent magnet blocks of uniform size shape (rather than variant magnet blocks)—thereby reducing the complexity in manufacturing the rotor assembly. Additionally, the manufacturing of the IPM machine 10 is further simplified because cutting laminations to the required shapes is a mechanized process, whereas other techniques for the reduction of torque ripple have additional manufacturing complexity.

Therefore, according to one embodiment of the invention, an internal permanent magnet machine includes a stator assembly comprising a stator core including a plurality of stator teeth and stator windings wound about the plurality of stator teeth to generate a stator magnetic field when excited with alternating currents. The internal permanent magnet machine also includes a rotor assembly disposed within a cavity defined by the stator assembly and configured to rotate relative to the stator assembly, wherein the rotor assembly further includes a shaft comprising a plurality of protrusions extending radially outward from a main shaft body and being formed circumferentially about the main shaft body and along an axial length of the main shaft body, a plurality of stacks of laminations arranged circumferentially about the shaft to receive the plurality of protrusions therein and each comprising a plurality of lamination groups arranged axially along a length of the shaft and wherein each of the plurality of lamination groups comprises a plurality of laminations; and a plurality of permanent magnets configured to generate a magnetic field that interacts with the stator magnetic field to produce a torque, wherein each permanent magnet is disposed between a respective pair of adjacent stacks of laminations. Each of the plurality of laminations includes a shaft protrusion cut formed therein to receive a respective shaft protrusion, and wherein, for each of the plurality of lamination stacks, the shaft protrusion cuts formed in the laminations of a respective lamination group are angularly offset from the shaft protrusion cuts formed in the laminations in an adjacent lamination group.

According to another embodiment of the invention, a method for assembling an internal permanent magnet machine includes providing a stator assembly comprising a stator core having a plurality of stator teeth with stator windings wound on the stator teeth to generate a stator magnetic field when excited with alternating currents and providing a rotor assembly that is rotatable within a cavity formed by the stator assembly. The step of providing the rotor assembly further includes providing a shaft comprising a plurality of protrusions that extend radially along an axial length of the rotating shaft and are formed circumferentially about the shaft and placing a plurality of stacks of laminations onto the plurality of shaft protrusions of the shaft such that the plurality of stacks of laminations are positioned circumferentially around the shaft and such that each of the plurality of stacks of laminations is arranged into a plurality of lamination groups along the axial length of the shaft, with the plurality of stacks of laminations being placed onto the plurality of shaft protrusions of the shaft such that adjacent lamination groups in each stack of laminations are positioned on the shaft to have an angular offset relative to each other. The step of providing the rotor assembly still further includes securing a plurality of permanent magnets in openings defined by the plurality of stacks of laminations, the plurality of permanent magnets generating a magnetic field that interacts with the stator magnetic field to produce a torque.

According to yet another embodiment of the invention, a rotor assembly for use in an internal permanent magnet machine includes a shaft having a shaft body and a plurality of protrusions extending radially outward from the shaft body, with the plurality of protrusions being formed along an axial length of the shaft and circumferentially about the shaft. The rotor assembly also includes a plurality of stacks of laminations disposed on the radial protrusions with each of the plurality of stacks of laminations comprising a plurality of lamination groups arranged axially along the shaft and wherein each of the plurality of lamination groups comprises a plurality of laminations and a plurality of permanent magnets disposed between the plurality of stacks of laminations. A shape of the laminations in each of the plurality of lamination groups of a stack of laminations is different from the shape of the laminations in others of the plurality of lamination groups in a stack of laminations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An internal permanent magnet machine comprising:
    a stator assembly comprising:
        a stator core including a plurality of stator teeth; and
        stator windings wound about the plurality of stator teeth to generate a stator magnetic field when excited with alternating currents
    a rotor assembly disposed within a cavity defined by the stator assembly and configured to rotate relative to the stator assembly, wherein the rotor assembly comprises:
        a shaft comprising a plurality of protrusions extending radially outward from a main shaft body, the plurality of protrusions being formed circumferentially about the main shaft body and along an axial length of the main shaft body;
        a plurality of stacks of laminations arranged circumferentially about the shaft to receive the plurality of protrusions therein, wherein each of the plurality of stacks of laminations comprises a plurality of lamination groups arranged axially along a length of the shaft and wherein each of the plurality of lamination groups comprises a plurality of laminations; and
        a plurality of permanent magnets configured to generate a magnetic field that interacts with the stator magnetic field to produce a torque, wherein each permanent magnet is disposed between a respective pair of adjacent stacks of laminations;
    wherein each of the plurality of laminations includes a shaft protrusion cut formed therein to receive a respective shaft protrusion, and wherein, for each of the plurality of lamination stacks, the shaft protrusion cuts formed in the laminations of a respective lamination group are angularly offset from the shaft protrusion cuts formed in the laminations in an adjacent lamination group.

2. The machine of claim 1 wherein the shaft comprises a single continuous shaft, with the plurality of protrusions being formed integrally with the main shaft body.

3. The machine of claim 1 wherein each permanent magnet disposed between a respective pair of adjacent stacks of laminations comprises a number of magnet blocks, with a magnet block corresponding to each of the lamination groups.

4. The machine of claim 3 wherein the plurality of stacks of laminations collectively form a rotor core, and wherein each of the plurality of lamination stacks forms a rotor pole of the rotor core.

5. The machine of claim 1 wherein the plurality of lamination groups includes a first lamination group, a second lamination group, and a third lamination group, wherein the second lamination group is axially positioned between the first lamination group and the third lamination group.

6. The machine of claim 5 wherein the shaft protrusion cuts formed in the laminations of the second lamination group are formed so as to be centered on the laminations.

7. The machine of claim 6 wherein the shaft protrusion cuts formed in the laminations of the first lamination group and the laminations of the third lamination group are formed so as to be offset from center on the laminations, with the shaft protrusion cuts formed in the laminations of the first lamination group being offset from center in a first angular direction and the shaft protrusion cuts formed in the laminations of the third lamination group being offset from center in a second angular direction opposite the first angular direction.

8. The machine of claim 7 wherein the shaft protrusion cuts formed in the laminations of the first lamination group and the laminations of the third lamination group are offset from center by an equal angle so as to be symmetrically formed about the shaft protrusion cuts formed in the laminations of the second lamination group.

9. The machine of claim 7 wherein the shaft protrusion cuts formed in the laminations of the first lamination group and the laminations of the third lamination group are offset from center by a different angle so as to be asymmetrically formed about the shaft protrusion cuts formed in the laminations of the second lamination group.

10. The machine of claim 1 wherein the angular offset between the shaft protrusion cuts formed in the laminations of adjacent lamination groups is equal to or less than half of a stator slot pitch.

11. The machine of claim 1 wherein the stator assembly and rotor assembly make up a segmented spoke electric motor having distributed windings.

12. A method for assembling an internal permanent magnet machine, the method comprising:
   providing a stator assembly comprising a stator core having a plurality of stator teeth, with stator windings wound on the stator teeth to generate a stator magnetic field when excited with alternating currents; and
   providing a rotor assembly that is rotatable within a cavity formed by the stator assembly, wherein providing the rotor assembly comprises:
      providing a shaft comprising a plurality of protrusions, wherein the protrusions extend radially along an axial length of the rotating shaft and are formed circumferentially about the shaft;
      placing a plurality of stacks of laminations onto the plurality of shaft protrusions of the shaft such that the plurality of stacks of laminations are positioned circumferentially around the shaft and such that each of the plurality of stacks of laminations is arranged into a plurality of lamination groups along the axial length of the shaft, with the plurality of stacks of laminations being placed onto the plurality of shaft protrusions of the shaft such that adjacent lamination groups in each stack of laminations are positioned on the shaft to have an angular offset relative to each other; and
      securing a plurality of permanent magnets in openings defined by the plurality of stacks of laminations, the plurality of permanent magnets generating a magnetic field that interacts with the stator magnetic field to produce a torque.

13. The method of claim 12 wherein providing the shaft comprises extruding the shaft as a single integral shaft.

14. The method of claim 12 further comprising forming a shaft protrusion cut in each lamination in the plurality of stacks of laminations, the shaft protrusion cut configured to receive a shaft protrusion therein.

15. The method of claim 14 wherein forming the shaft protrusion cut comprises laser cutting the shaft protrusion cut in the lamination.

16. The method of claim 14 wherein, for each of the plurality of lamination stacks, the shaft protrusion cuts formed in the laminations of a respective lamination group are angularly offset from the shaft protrusion cuts formed in the laminations in an adjacent lamination group.

17. The method of claim 16 wherein the angular offset between the shaft protrusion cuts in adjacent lamination groups is half of a stator slot pitch.

18. A rotor assembly for use in an internal permanent magnet machine, the rotor assembly comprising:
   a shaft including a shaft body and a plurality of protrusions extending radially outward from the shaft body, the plurality of protrusions being formed along an axial length of the shaft and circumferentially about the shaft;
   a plurality of stacks of laminations disposed on the radial protrusions, wherein each of the plurality of stacks of laminations comprises a plurality of lamination groups arranged axially along the shaft and wherein each of the plurality of lamination groups comprises a plurality of laminations; and
   a plurality of permanent magnets disposed between the plurality of stacks of laminations;
   wherein a shape of the laminations in each of the plurality of lamination groups of a stack of laminations is different from the shape of the laminations in others of the plurality of lamination groups in a stack of laminations.

19. The rotor assembly of claim 18 wherein each of the plurality of laminations includes a shaft protrusion cut formed therein to receive a respective shaft protrusion, and wherein, for each of the plurality of lamination stacks, the shaft protrusion cuts formed in the laminations of a respective lamination group are angularly offset from the shaft protrusion cuts formed in the laminations in an adjacent lamination group.

20. The rotor assembly of claim 19 wherein the angular offset of the shaft protrusion cuts in adjacent lamination groups introduces a net rotor shift by an equivalent electrical angle equal to a single stator slot shift.

21. The rotor assembly of claim 18 wherein the shaft comprises a single continuous shaft, with the plurality of protrusions being formed integrally with the shaft body.

22. The rotor assembly of claim 18 wherein a permanent magnet disposed between a respective pair of adjacent stacks of laminations comprises a number of magnet blocks, with a magnet block being associated with each of the plurality of lamination groups; and
   wherein the magnet blocks forming each permanent magnet are angularly offset from one another so as to pass a same stator coil at a different time while the rotor assembly rotates, so as to reduce torque ripple.

* * * * *